United States Patent [19]

Javan et al.

[11] 3,719,822

[45] March 6, 1973

[54] METHOD OF GENERATING A SIGNAL WITH A FREQUENCY BETWEEN $10^{11}$ AND $10^{15}$ HZ WITH EXTREME FREQUENCY STABILITY

[75] Inventors: Ali Javan, Boston; Lon O. Hocker, III, Watertown, both of Mass.

[73] Assignee: Massachusetts Institute of Technology, Cambridge, Mass.

[22] Filed: March 29, 1971

[21] Appl. No.: 128,815

[52] U.S. Cl. ................250/83.3 H, 250/84, 331/94.5

[51] Int. Cl. ................................................G01t 1/16

[58] Field of Search ................250/83.3 H, 84, 211 J; 331/94.5

[56] References Cited

UNITED STATES PATENTS 3,229,095 1/1966 Lasher et al..........................250/84

*Primary Examiner*—James W. Lawrence
*Assistant Examiner*—Davis L. Willis
*Attorney*—Thomas Cooch et al.

[57] ABSTRACT

The output signal of a laser at a frequency $V_f$ is mixed in a metal point contact diode with the output of a klystron having a variable frequency $V_m$. Because of the diode's non-linearities, the current flowing through the diode will contain and reradiate sideband components at frequencies $V_s = V_f \pm V_m$. Simultaneously, the diode is subjected to a reference signal with a fixed frequency having a harmonic which falls at a frequency close to one of the sideband frequencies $V_s$. A beat note is produced which fluctuates in frequency due to the instability of the laser frequency $V_f$. The beat note frequency is compared with a stable source and an error signal corresponding to the fluctuations is obtained which in turn is used to adjust $V_m$ to compensate for the instability in $V_f$, whereby the frequency $V_s$ is stabilized to a degree equal to that of the reference source. Additionally, the frequency of the sideband is determined to the same degree of precision. This information is extremely important and useful in making frequency measurements in the infrared region where it is difficult to produce a beat note by standard techniques of mixing a high harmonic of a known microwave signal with an unknown high frequency due to the low power of such a high harmonic. Here, harmonics of the components of stabilized laser sideband are used as intermediate step frequencies to bridge the gap between the microwave and visible regions.

13 Claims, 1 Drawing Figure

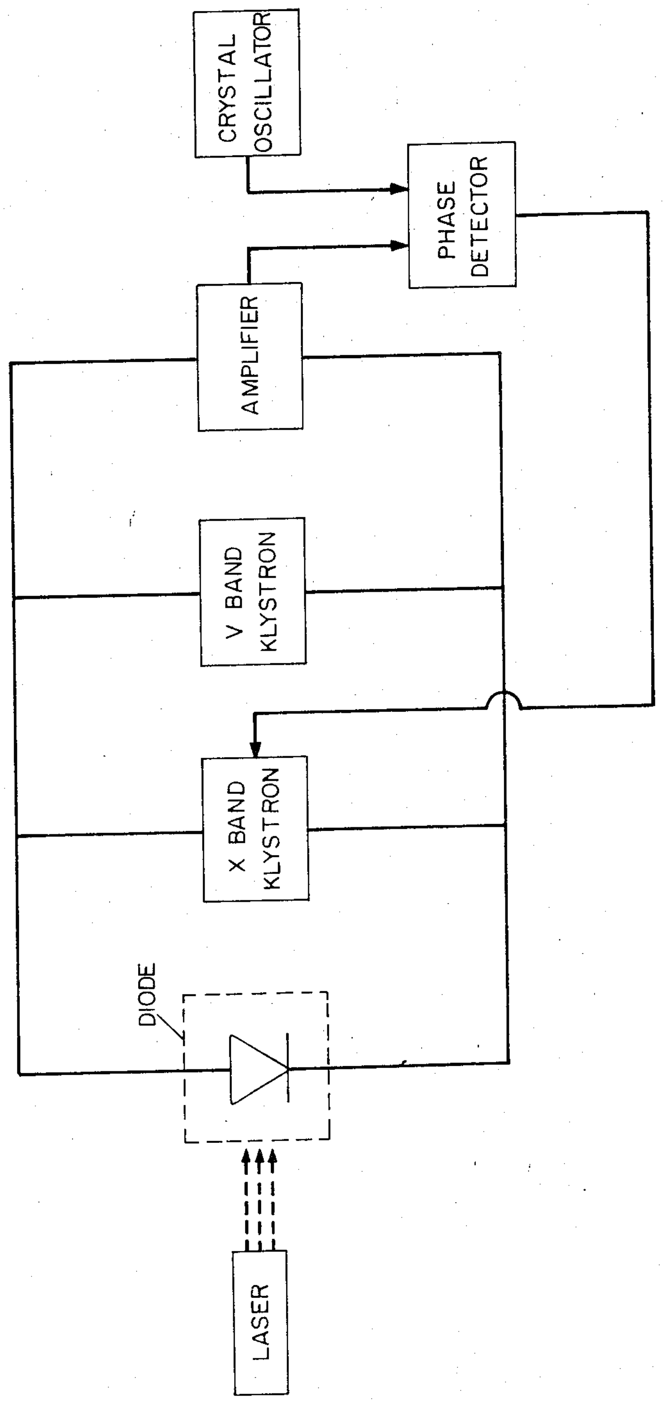
INVENTORS:
ALI JAVAN
LON HOCKER
BY

METHOD OF GENERATING A SIGNAL WITH A FREQUENCY BETWEEN $10^{11}$ AND $10^{15}$ HZ WITH EXTREME FREQUENCY STABILITY

This invention was made in the course of work performed under contracts with the U.S. Air Force and the U.S. Army.

FIELD OF INVENTION

This invention relates generally to infrared frequency mixing and frequency stabilization and measurement techniques.

PRIOR ART

The sources of coherent radiation with wavelengths between 300 and 1/10 micron are principally lasers. The frequency stability for free running gas or semiconductor lasers is between one part in $10^4$ and one part in $10^7$. There are no general methods of stabilizing laser frequencies to a high degree of accuracy. However, there are techniques applicable to special cases such as those developed by John Hall of the Bureau of Standards, and those described by Javan and Freed in Applied Physics Letters, July 15, 1971, "Standing Wave Saturation Resonances in the $Co_2$ 10.6$\mu$ Transitions Observed in a Low Pressure Room Temperature Absorber Gas." These techniques can be used to stabilize particular lasers to a high degree of accuracy and can be used as references in conjunction with the techniques taught by applicants' inventions.

SUMMARY OF INVENTION

In view of the limitations in achieving a high degree of frequency stability in the infrared and far infrared range, one object of applicants' invention is to provide a method of generating sideband laser signals with frequencies in the infrared and far infrared range with a stability far exceeding that obtainable with known techniques.

It is another object of applicants' invention to provide a method of making absolute frequency measurements in the infrared and far infrared region.

These and other objects are met by processes comprising:

1. mixing a laser frequency $V_f$ with a microwave frequency $V_m$ to produce a sideband frequency $V_s = V_f \pm V_m$,
2. mixing the sideband frequency $V_s$ with a harmonic of a fixed microwave reference source, said harmonic falling close to the sideband frequency, thereby producing a beat note,
3. comparing the beat note frequency with a stable source and obtaining an error signal corresponding to the fluctuations in the beat note due to the laser instability.
4. utilizing the error signal to adjust frequency $V_m$ to compensate for the changes in $V_f$ with an unknown higher frequency, whereby the unknown frequency is determined from the resultant beat note frequency and the laser sideband frequency $V_s$.

Further objects and a better understanding of the apparatus thereof will become more apparent with the following description taken in conjunction with the accompanying drawing showing a diagrammatic view of the processes.

PREFERRED EMBODIMENT

In the accompanying drawing, the output radiation from a laser, e.g., a 337 HCN gas laser is mixed in a diode with an arbitrary frequency from a microwave source, e.g., 10 GHz from an X-band klystron. Typically, the mixing is accomplished with a metal to metal point contact diode with a 2 micron diameter cat whisker having an electrochemically etched point, a metal base, and a means for adjusting the contact pressure between the whisker and base. Such a diode is more fully described by V. Daneu, D. Sokoloff, A. Sanchez and A. Javan, "Extension of Laser Harmonic Frequency Mixing Techniques Into the 9 $\mu$ Region With an Infrared Metal Point Contact Diode, "Applied Physics Letters 15, 398 Dec. 1969. Because of the diode's non-linearities, the far infrared frequency current flowing through the diode will contain and reradiate sideband components. If we let $V_f$ represent the laser frequency and $V_m$ represent the X-band microwave frequency, then the diode will contain and reradiate sideband components at frequencies $V_s = V_f \pm V_m$.

It should be noted that the frequency stability of $V_f$ is about one part in $10^6$ and that as $V_f$ fluctuates $V_s$ will fluctuate correspondingly as the fluctuations of $V_m$ are relatively insignificant. Of course, $V_f$ may be tuned over several megahertz by mechanically moving one of the laser interferometer mirrors, but this is a relatively slow process which occurs with a considerable time lag and phase shift. On the other hand, $V_m$ may be tuned over much wider bandwidths by tuning the microwave source. In the case of a klystron, this is easily achieved by applying an electrical voltage to the klystron reflector. This type of tuning has a fast response time and occurs with very little lag and phase shift.

Simultaneously with the mixing of the laser frequency and the arbitrary microwave frequency, the diode is subjected to the output of a microwave reference source with a fixed frequency. This frequency is chosen such that a harmonic falls close to the sideband frequency. In our example, a V-band klystron operating in the 70 GHz range would have a thirteenth harmonic falling close to the sideband component resulting from the mixing of the 337$\mu$ laser frequency and the 10 GHz frequency produced by the X-band klystron. In fact, the V-band klystron is set so that a beat note is amplified by a 40 MHz IF amplifier as shown in the accompanying drawing. The bandwidth of the amplifier is several megahertz in order to accommodate the frequency fluctuations of the beat note which results from the instability of the laser frequency. If the stability of the laser is one part in $10^6$ and its output is approximately $10^{12}$ Hz, then its fluctuations range up to $10^6$ Hz thereby determining the necessary bandwidth requirement of the IF amplifier.

The fluctuations of the beat note are sensed by comparing the beat note frequency with a stable source. In our example, we compare the 40 MHz beat note with the frequency of a stable 40 MHz crystal controlled oscillator. This is accomplished by detecting the change in the phase of the beat note signal with respect to the stable source in a phase detector. This technique is well known in the art as phase locking. This phase detector sends out an electrical correctional signal proportional to the difference in phase between the two input signals. This correction signal is fed back to the X-band klystron reflector thereby changing its output frequency $V_m$ to compensate for the changes in $V_f$ whereby $V_f$ is stabilized and the beat note frequency becomes phase locked to the stable source.

Since it is possible to use a 40 MHz reference source whose stability exceeds a fraction of a cycle, this method will then achieve phase locking of the far infrared sideband frequency to within a fraction of a cycle compared with the reference frequency, the thirteenth harmonic of the V-band signal. The V-band source, in turn, can be made very stable. For instance its frequency can be phase locked by standard techniques against higher harmonics of a stable radio frequency source to an accuracy of one part in $10^{11}$ or better. Hence, the sideband infrared frequency is correspondingly stabilized to an enormous and here-to-fore unknown stability.

Additionally, the absolute frequency of the sideband is known to the same precision. It is equal to the frequency of the harmonic of the reference frequency plus or minus the beat note frequency, depending upon whether the harmonic is higher or lower than the sideband. This, of course, can be determined by standard techniques, as for instance by increasing the frequency of the reference signal and observing the change in the beat note frequency.

The knowledge of the absolute frequency is very important and useful in measuring unknown frequencies in the infrared region. In the infrared region, it is difficult to measure frequency by beating an unknown frequency with a high harmonic of a microwave reference signal due to the low power of the high harmonic. Hence, an intermediate step frequency is necessary to bridge the gap. Here the unstabilized laser frequency $V_f$ and variable microwave frequency $V_m$ may be utilized in the following manner. Suppose it is desired to determine the frequency of a 79 $\mu$ water vapor laser. An unstabilized 311 $\mu$ HCN laser frequency can be used to bridge the gap between a known microwave frequency and the unknown 79 $\mu$ frequency. Initially, the output of the HCN laser and an X-band klystron operating around 9 GHz are mixed in a first diode with the fourteenth harmonic of a V-Band klystron operating at 70 GHz. A beat note frequency is obtained and phase locked to a stable source by controlling the X-band klystron as described above. The sideband difference frequency $V_s = V_f - V_m$ is accurately determined according to the teachings supra. The components of $V_s$, that is the unstabilized 311 $\mu$ HCN laser frequency and the compensated 9 GHz microwave signal, are then mixed in a second diode with the output of the 79 $\mu$ water vapor laser. In this process, the difference frequency of the fourth harmonic of the 311 HCN $\mu$ laser and the 9 GHz klystron frequency, $4V_f - 4V_m$, lies very close to the 79 $\mu$ water vapor laser thereby producing a beat note frequency. Since the beat note frequency can be accurately measured and since the difference between the fourth harmonic of $V_f$ and fourth harmonic of $V_m$ is known, the frequency of the water laser can be easily determined.

It is important to note that only the components of the sideband laser difference frequency are utilized, not the reradiated sideband signal. Hence, by using an unstabilized 311 $\mu$ HCN laser frequency, the bridge between the microwave region and far infrared has been bridged. Indeed, by repeated applications and extensions of these principles, one can readily see that absolute frequency measurements can be made into the infrared region. Further by utilization of this method and known bulk crystal techniques, the chain can be extended well into the visible region.

It should be noted that in the above description the sideband frequencies $V_s$ were described as $V_f \pm V_m$. In general, sideband frequencies equal to $nV_f \pm qV_m$, where $n$ and $q$ are integers, are reradiated. However, when $n$ and $q$ are greater than one, the output power is diminished.

If the output is low, the reradiated signal may be amplified. One means of accomplishing this is to focus the reradiated signal into a parallel beam by a lens or other means onto one end of a long discharge tube which exhibits gain at the frequency of the signal. For instance, in our example, a HCN laser at 337 $\mu$ and a microwave input of 74 GHz would produce a reradiated sideband frequency from the diode at 311 $\mu$. A HCN laser exhibits gain at 311 $\mu$. Hence, if the reradiated signal is focused on a discharge tube containing HCN gas at an appropriate pressure, the signal will be amplified. One limitation in this method is that at infrared frequencies the gain exhibited in discharge tubes is small. For instance, the gain of HCN laser at 311 $\mu$ is about 10 – 15 percent per meter. Hence if the reradiated signal is at low power, a very long discharge tube might be required to obtain appreciable amplification.

Another method of amplifying the signal would be to use a regenerative type amplifier. One example of this class is a conventional discharge tube bounded by two parallel partially reflecting mirrors. If the reflectivity is chosen properly, the laser would be on the threshold of oscillation, but not quite oscillating. Under these conditions an input reradiated signal from the diode is strongly amplified.

The above stabilization technique may be modified by using a $CO_2$ gas laser operating in the 9.2$\mu$ region to 10.7$\mu$ region for a reference in place of a V-band klystron. The $CO_2$ laser's output at 9.3$\mu$ can be stabilized to one part in $10^{10}$ by techniques described by Javan and Freed in "Standing Wave Saturation Resonances in the $CO_2$ 10.6$\mu$ Transition Observed in a Low Pressure Room Temperature Absorber Gas." New refinements in this process are currently in process to achieve a stabilization of one part in $10^{13}$. This reference can be utilized to produce stable sideband frequencies for higher or lower frequencies. For example, the third harmonic of the difference frequency of the output of a 28 $\mu$ water vapor laser and the output of an X-band klystron producing a 10 GHz signal lies very close to the 9.3 $\mu$ frequency of the $CO_2$ laser. Hence, a beat note is produced by mixing in the diode the third harmonic of the sideband frequency and the 9.3 $\mu$ reference signal. This is compared with a stable source whereby an error signal is produced to control the X-band klystron stabilizing the sideband difference frequency. Likewise, the second harmonic of the 10.6$\mu$ $CO_2$ laser frequency can be used as a reference to stabilize a sideband frequency of the 5.3 $\mu$ transition of the $CO_2$ laser.

In the above illustrations a harmonic of the reference signal is compared with a laser sideband frequency or, a harmonic of a sideband frequency is compared with a reference signal. If the sideband frequency to be stabilized and reradiated is far away from the reference source, it is desirable to modify this technique by using an intermediate step frequency as was illustrated above with respect to making absolute frequency measurements. As an example, support it is desired to stabilize a sideband of 28 μ water vapor laser, one could utilize the 150th harmonic of a V-band klystron operating at 70 GHz; however, this harmonic would be very weak. It is therefore more advantageous to use an intermediate frequency. In stabilizing a 28 μ sideband it is convenient to use the 337 μ frequency as an intermediate frequency. The output from an HCN laser operating at 337 μ and a klystron operating at 3 GHz are mixed in a first point contact diode with the thirteenth harmonic of a V-band klystron operating at 70 GHz. The best note frequency is obtained and phase-locked to a stable source by controlling the output of the klystron. The output frequency of the klystron and the output of the 337 μ HCN laser are mixed in a second diode with the output frequency of a 28 μ water laser and the output of an adjustable X-band klystron. Here the twelfth harmonic of the sum of the 337 μ frequency and 3 GHz signal lies close to the sum of the 28 μ laser and X-band frequency, i.e., the sideband of the 28 μ laser. A beat note is produced and phase-locked to a stable source by controlling the frequency of the X-band klystron. Hence, the reradiated sideband of the 28 μ laser is stabilized by utilizing an unstabilized lower laser frequency to bridge the gap between the high frequency water laser and low frequency V-band reference. It should be noted here that it is not necessary to use the sideband frequency at the intermediate lower laser frequency, but only its components, namely, the 3 GHz frequency and the unstabilized 337 μ HCN laser. Likewise, this technique could be used to generate a stable sideband of the 337 μ HCN laser using the stable 10.6 μ output of the $CO_2$ laser as a reference and a 100 μ unstabilized laser as an intermediate step frequency. Hence, one can readily see by using these techniques that stabilized sidebands and reradiated signals are achieved in the far infrared and infrared. The sidebands have a heretofore unknown stability.

What is claimed is:

1. A method of generating a stabilized sideband laser frequency in the far infrared and infrared range comprising:

a. mixing a laser frequency $V_f$ with radiation from a source having an adjustable frequency $V_m$ thereby producing sideband frequencies $V_s = nV_f \pm qV_m$, $n$ and $q$ being integers,
b. mixing the sideband frequency $V_s$ with a reference signal having a harmonic whose frequency falls close to $V_s$, thereby producing a beat note,
c. comparing the frequency of the beat note with the frequency of a stable source, and obtaining an error signal responsive to the difference between the frequency of the beat note and the stable source,
d. feeding back the error signal to the source to adjust $V_m$ such that the frequency of the beat note and standard are locked, whereby $V_s$ remains constant to the same degree of stability as the reference source.

2. A method of generating a signal with a frequency in the far infrared and infrared range as recited in claim 1 wherein said laser frequency $V_f$ is mixed with radiation from a microwave source having an adjustable frequency $V_m$ and wherein said error signal is fed back to said microwave source, whereby a stabilized sideband $V_s = V_f \pm V_m$ is produced.

3. A method of generating a signal with a frequency in the far infrared and infrared range as recited in claim 1 wherein said laser frequency $V_f$ is mixed with radiation from a radio source having an adjustable frequency $V_m$ and wherein said error signal is fed back to said radio source.

4. A method of generating a signal with a frequency in the far infrared and infrared range as recited in claim 1 further comprising:

a. focusing the energy of the sideband frequency $V_s$ into a parallel beam,
b. directing said beam into a discharge tube exhibiting gain at the sideband frequency,
c. amplifying said sideband frequency $V_s$ in said discharge tube.

5. A method of generating a signal with a frequency in the far infrared and infrared range as recited in claim 1 further comprising:

a. focusing the energy of the sideband frequency $V_s$ into a parallel beam,
b. directing said beam into a regenerative amplifier, said amplifier being on the threshold of oscillation but not quite oscillating,
c. amplifying said sideband frequency in said regenerative amplifier.

6. A method of generating a signal with a frequency in the far infrared and infrared range comprising:

a. mixing a laser frequency $V_f$ with radiation from a source having an adjustable frequency $V_m$ thereby producing sideband frequencies $V_s = nV_f \pm qV_m$, $n$ and $q$ being integers,
b. mixing the sideband frequency $V_s$ with a reference signal having a harmonic whose frequency falls close to $V_s$, thereby producing a beat note,
c. comparing the frequency of the beat note with the frequency of a stable source, and obtaining an error signal responsive to the difference between the frequency of the beat note and the stable source,
d. feeding back the error signal to the source to adjust $V_m$ such that the frequency of the beat note and standard are locked, whereby $V_s$ remains constant to the same degree of stability as the reference source,
e. mixing an unstabilized laser frequency $V_y$ with radiation from a source having an adjustable frequency $V_x$, thereby producing sideband frequencies $V_z = nV_y \pm qV_x$, $n$ and $q$ being integers,
f. mixing the sideband frequency $V_z$ with a harmonic of $V_m$ and an actual harmonic of $V_f$ whose sum falls close to $V_z$, thereby producing a beat note,
g. comparing the frequency of the beat note with the frequency of a second stable source, and obtaining an error signal responsive to the difference between the frequency of the beat note and the second stable source,
h. feeding back the error signal to the source to adjust $V_x$ such that the frequency of the beat note and the second stable source are locked, whereby $V_z$ remains constant to the same degree of stability as $V_s$.

7. A method of generating a signal with a frequency in the far infrared and infrared range comprising:

a. subjecting the metal cat whisker of a first nonlinear point contact diode with laser radiation of frequency $V_f$ and with radiation from a microwave source having an adjustable output frequency $V_m$, said cat whisker having a diameter of the order of the wavelength corresponding to $V_f$, whereby a current is induced in and reradiated by the diode with sideband frequencies $V_s = nV_f \pm qV_m$, $n$ and $q$ being integers, b. simultaneously subjecting the cat whisker to an extremely stable microwave signal having a harmonic whose frequency falls close to $V_s$, thereby producing a beat note across the diode, c. comparing the frequency of the beat note with the frequency of a stable source and obtaining an error signal responsive to the difference between the frequency of the beat note and the stable source, d. feeding back the error signal to the microwave source to adjust $V_m$ to phase lock the frequency of the beat note to the frequency of the stable source, whereby $V_s$ remains constant to the same degree of stability as the microwave signal.

8. A method of generating a signal with a frequency in the far infrared and infrared range as recited in claim 7 further comprising:

a. subjecting the metal cat whisker of a second nonlinear point contact diode with laser radiation of frequency $V_x$ and with radiation from a microwave source having an adjustable output frequency $V_y$, said cat whisker having a diameter of the order of the wavelength corresponding to $V_x$, whereby a current is induced in and reradiated by the diode with sideband frequencies $V_z = nV_x \pm qV_y$, $n$ and $q$ being integers, b. simultaneously subjecting the cat whisker of said second diode to a harmonic of $V_f$ and an equal harmonic of $V_m$ whose sum falls close to $V_z$, thereby producing a beat note across said second diode, c. comparing the frequency of the beat note with the frequency of a second stable source and obtaining an error signal responsive to the difference between the frequency of the beat note and the second stable source, d. feeding back the error signal to the microwave source to adjust $V_y$ to phase lock the frequency of the beat note to the frequency of the second stable source, whereby $V_z$ remains constant to the same degree of stability as $V_s$.

9. A method of measuring an unknown far infrared or infrared frequency to a high degree of accuracy comprising:

a. mixing an unstabilized lower laser frequency $V_L$ with radiation from a microwave source having an adjustable frequency $V_m$, thereby producing sideband frequencies $V_s = nV_L \pm qV_m$, $n$ and $q$ being integers, b. mixing the sideband frequency $V_s$ with a microwave reference frequency $V_R$ having a harmonic whose frequency falls slightly lower than $V_s$, thereby producing a first beat note, c. comparing the first beat note frequency with the frequency of a stable source and obtaining an error, signal responsive to the difference between the frequency of the first beat note and the stable source, d. feeding back the error signal to the source to adjust $V_m$ such that the frequency of the first beat note and stable source are locked, whereby $V_s$ remains constant to the same degree of stability as the reference source, said frequency $V_s$ being equal to the harmonic of the microwave reference frequency, $V_R$, plus the first beat note frequency, e. mixing the unknown frequency with a harmonic of $V_L$ and an equal harmonic of $V_m$ whose sum falls slightly lower than the unknown frequency, whereby a second beat note frequency is produced and whereby said unknown frequency is determined as being equal to the sum of the harmonic of $V_L$ and the equal harmonic of $V_m$ plus the second beat note frequency.

10. A method of measuring an unknown far infrared or infrared frequency to a high degree of accuracy as recited in claim 9 wherein the harmonic of $V_R$ falls slightly higher than $V_s$, whereby $V_s$ is equal to the harmonic of $V_R$ minus the beat note frequency.

11. A method of measuring an unknown far infrared or infrared frequency to a high degree of accuracy as recited in claim 9 wherein the mixing of the unknown frequency is with a harmonic of $V_L$ minus a harmonic of $V_m$, and said unknown frequency is determined as being equal to the harmonic of $V_L$ minus the harmonic of $V_m$ plus the second beat note frequency.

12. A method of measuring an unknown far infrared or infrared frequency to a high degree of accuracy as recited in claim 9 wherein the sum of the harmonic of $V_L$ and $V_m$ falls slightly higher than the unknown frequency, whereby the unknown frequency is determined as being equal to the harmonic of $V_L$ and harmonic of $V_m$ minus said second beat note frequency.

13. A method of measuring an unknown far infrared or infrared frequency to a high degree of accuracy as recited in claim 9 wherein the harmonic of $V_L$ minus the harmonic of $V_m$ falls slightly higher than the unknown frequency, whereby the unknown frequency is determined as being equal to the harmonic of $V_L$ minus the harmonic of $V_m$ less said second beat note frequency.

* * * * *